March 27, 1934.  E. N. SNODGRASS  1,952,101
METHOD OF PRODUCING CONFECTIONS
Filed Sept. 24, 1932
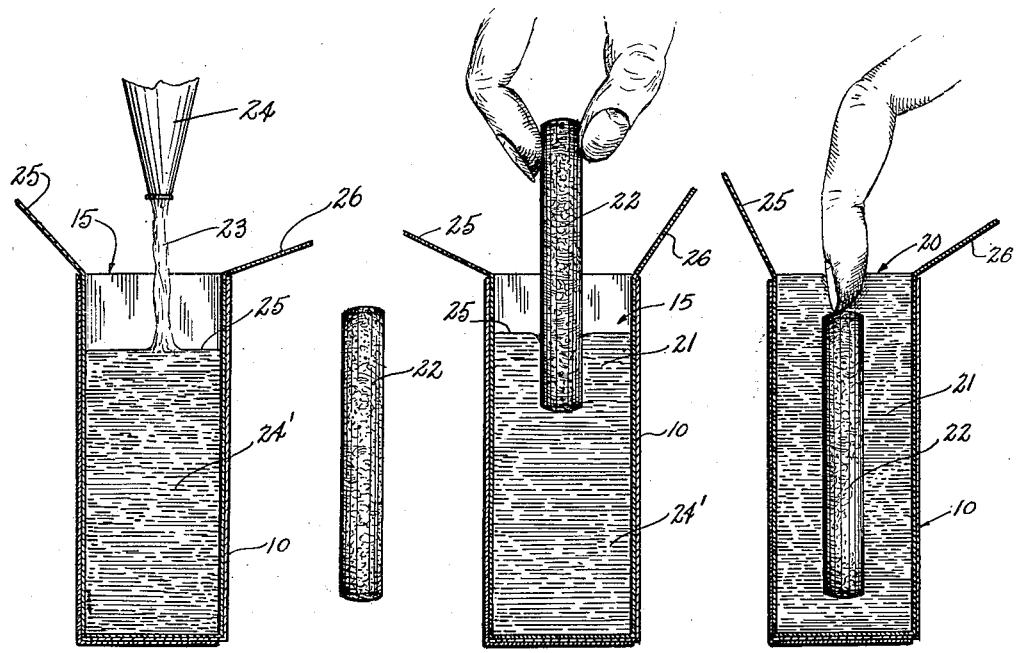
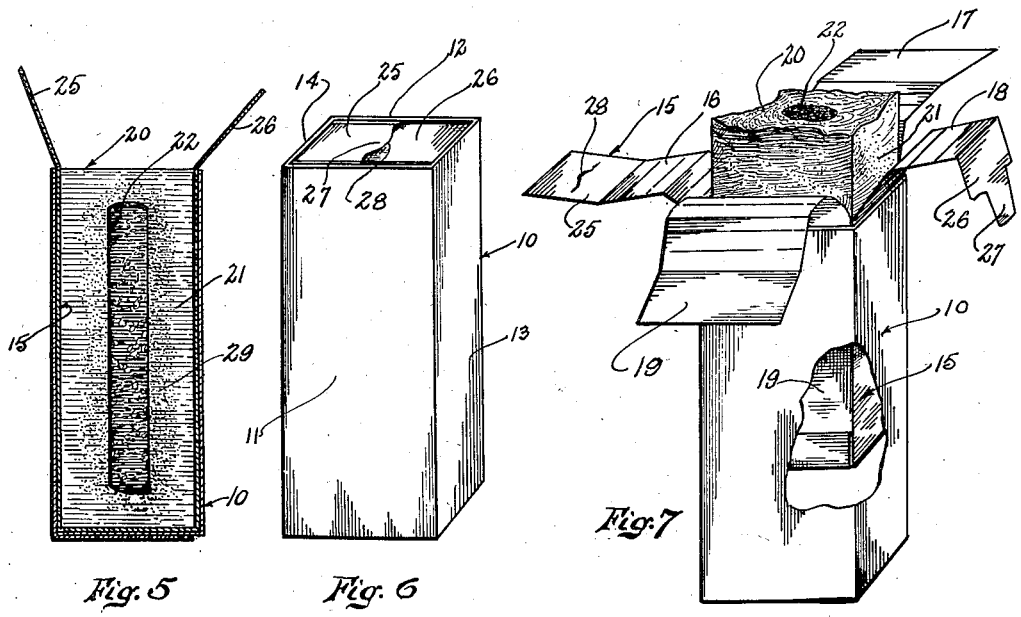
INVENTOR
EDWARD NORMAN SNODGRASS
BY
ATTORNEY.

Patented Mar. 27, 1934

1,952,101

UNITED STATES PATENT OFFICE 1,952,101

METHOD OF PRODUCING CONFECTIONS

Edward Norman Snodgrass, Denver, Colo., assignor to Norman Confections, Inc., Denver, Colo., a corporation of Colorado Application September 24, 1932, Serial No. 634,675

9 Claims. (Cl. 107—54)

This invention relates to improvements in frozen confections and more particularly to their method of manufacture, although certain features thereof may be employed with equal advantage for other purposes.

It contemplates more especially the provision of a novel manner of producing normally unstable confections without resort to difficult moulding expedients.

Confections and refrigerated edibles are becoming increasingly popular, but an objectionable feature is the inability to produce such on a production basis and the required handling during the consumption thereof to the end that the accidental lodgment thereof on the individual's garment proves most annoying. This is especially true with confections which attempt to confine various forms of fillers and other syrupy contents which are incapable of retention without undue care and attentive handling. Moreover, such must be consumed by resort to forks, dishes, spoons, and other utensils, and for that reason ice cream confections have ordinarily been served plain or with dry and rigid fillers.

With the teachings of the instant invention, the intricate features of producing normally unstable ice cream and confections are entirely overcome, and improved ice cream edibles and confections are capable of advantageous preparation, distribution and hand consumption with enhanced taste and facility and without resort to dishes, forks or other commonly employed eating implements which are not usually available in automobile travel and other situations. Moreover, most any type of confection filler may be employed with liquid or syrupy taste imparting ingredients such as fruit and chocolate syrups to the end that novel ice cream sundaes may be readily produced and served over the counter in a very tasty and improved manner without subjecting the individual to any possible embarrassment or inconvenience through the soiling of garments by the accidental lodgment of liquid or viscous filler.

The production of such normally unstable confections has heretofore involved very difficult and careful moulding operations together with temperature controls and numerous repeat steps involving expensive and cumbersome apparatus. Then, too, known processes entail much time and labor to the end that numerous obstacles confronted the commercial production of confections of the type mentioned. These disadvantages have been entirely overcome with the teachings of the instant invention pertaining to a novel method of confection production without entailing much time, labor, equipment and expense. Simplicity, speed, and a minimum investment in equipment are conducive factors in a commercially practical process or method of manufacture. It has been found that the moulding operations are not entirely satisfactory in the production of normally unstable confections and have proven too costly and of impractical value.

One object of the present invention is to provide a novel method of producing normally unstable confections of a composite character.

Another object is to utilize the phenomena of heat exchanges in the production of a normally unstable confection of composite constituents having a different physical characteristic.

Still another object is to provide a novel method of producing an ice cream confection having a liquid core defined therein.

A further object is to provide a novel method of producing a confection having normally liquid material as composite and distinct constituents thereof.

Still a further object is to introduce a normally liquid core within an edible casing in an initially frozen state.

A still further object is to process normally liquid materials for conversion into a composite confection having a frozen casing with a liquid core.

Other objects and advantages will appear from the following description of an illustrative embodiment of the present invention.

In the drawing:

Figure 1 is a sectional view in elevation showing the initial step of the process embodying features of the present invention.

Figure 2 is a view in elevation of the initial state of the core utilized for introduction into the mass confined in the container disclosed in Figure 1.

Figure 3 is a sectional view in elevation showing the manner in which the frozen core disclosed in Figure 2 is introduced in a mass illustrated in Figure 1.

Figure 4 is a sectional view in elevation disclosed in the next step of the process wherein the frozen core is submerged for confinement on all sides by the mass.

Figure 5 is a similar view in sectional elevation of the product after completion of the series of steps for the confinement of the core by a plastic mass of edible materials such as ice cream.

Figure 6 is a perspective view of a carton showing the finished product.

Figure 7 is an enlarged fragmentary perspective view of the carton after it is opened and the liner reversely peeled to expose the confection for consumption from the hand.

The structure selected for illustration exemplifies a novel process of producing a normally unstable confection consisting of the composite association of different materials to present a frozen product preferably consumed from the hand without resort to dishes, spoons or other utensils commonly employed for that purpose. In this instance, a container casing 10 is employed, it being stamped or otherwise shaped from sheet material such as cardboard of substantially rectangular configuration to present parallel walls 11—12 and 13—14. A liner 15 having segregated walls 16, 17, 18 and 19, is telescopically associated with the casing 10 so as to define a container which will receive a confection for total confinement therein. The liner 15 has the peel-back or reversely foldable walls 16, 17, 18 and 19 which enable the progressive consumption of the confection contents 20 directly from the hand without resort to any auxiliary expedient such as spoons, dishes and other eating implements. While this particular type of container is disclosed in connection with the confection 20, it must be distinctly understood that any other form of container or mould may be employed for purposes of producing confections in accordance with the teachings of the instant invention.

The confection 20 preferably consists of a normally liquid material frozen to a substantially solid state to define a casing 21 which encloses and completely confines an elongated core 22 having a normally liquid constituent as an essential part thereof. The casing 20 encloses the core 22 on all sides, and is preferably in a substantially liquid or aqueous state after the confection is ready for consumption thereby constituting a composite confection affording the taste characteristics of the normally termed ice cream sundae. The customary ice cream sundae is not capable of consumption without resort to dishes, spoons and other eating implements and, therefore, a confection of the character described possesses marked advantages owing to the fact that consumption is effected directly from the hand and the production thereof is facilitated on a commercial basis. The customarily termed ice cream sundae is primarily a dessert in contradistinction to the composite product serving as a confection for commercial production, transportation and sale directly over the counter.

The confection 20 is produced by resort to the phenomena of heat exchanges, since moulding has proven too cumbersome, expensive and impractical. To this end, the cartons 10 are successively filled with a partially frozen liquid in the form of a plastic mass which may for brevity be termed a freeze such as ice cream 23 as it leaves the discharge spout 24 of any suitable packaging machine known to the ice cream industry. The plastic freeze such as ice cream is prepared in a freezer for discharge in its flowable state to the packaging machine having a spout 24 in connection therewith. The freeze 23 is poured responsive to the urge of gravity into the cartons 10 to define a plastic body 24' filling the carton liner 15 to a level 25 allowing sufficient unoccupied space therein equivalent to the displacement offered by the core 22 of the completed confection 20 as will appear more fully hereinafter.

Thereupon, an elongated core 22 preferably though not essentially consisting of normally liquid syrup or extract moulded to assume a preformed configuration responsive to the subjection thereof to freezing temperatures while in a mould of similar shape, thereby effecting the conversion thereof into a substantially solid state. The pre-formed core 22 is thus maintained frozen at a temperature much below the freezing point of the normally liquid body such as the ice cream 24', and it may assume any pre-formed configuration as commercial practice may dictate, in this instance of elongated cylindric shape with a length somewhat shorter than that of the casing 21.

The frozen normally liquid core 22 is then inserted by the attendant or in any other manner as commercial practice may dictate, into the plastic freeze 24' along a longitudinal medium or axial line thereof for consequent submersion therein. As a result, the plastic freeze 24' encloses the core 22 for concealment on all sides, it being possible to effect the submersion by the finger tip or by resort to machinery or other expedients conductive to the accomplishment thereof in the most effective manner. After the core 22 is submerged in the plastic freeze 24' so as to assume a position substantially centrally of the exterior confines thereof, the carton 10 with its liner 15 will be fully occupied by the freeze 24' owing to the displacement effected by the submerging core 22. With the normally liquid freeze 24' substantially filling the carton 10 after the insertion of the core 22 therein, the flaps 26 and 26 of the container liner 15 are overlapped so that the tongue 27 and slit 28 thereof, respectively, interengage to effect the locked confinement of the freeze 20 with its frozen core 22.

It must be appreciated that the frozen core 22 is very much lower in temperature than the surrounding freeze 24', and immediately there is an exchange of heat between these two bodies to the end that the core 22 gradually liquefies to transmit its cold to the surrounding casing 21 with the latter surrendering its heat to the core 22. Consequently, the material of the casing 21 immediately surrounding the core 22 will become hardened and the latter liquefied even in the presence of external refrigeration in order to harden the casing 21 throughout the interior extent thereof. The heat exchange is effected in the zone 29 immediately approximate to the core 22, and the exterior refrigeration by the placement of the cartons 10 in a hardening room, penetrates for a sufficient extent to harden the casing 21 without impairing the liquid consistency of the core 22 confined by the normally liquid casing 21 frozen to a substantially solid state.

It must be observed that the syrup used for the core constitutes almost and sometimes a completely saturated sugar solution which has a very low freezing point with the result that ordinary freezing temperatures for ice cream does not influence the flowable condition or liqu:dity of the core. In fact, the freezing coefficient of the syrup is so low as to normally constitute a liquid at ordinary temperatures of ice cream solidity. It is thus possible to resort to the phenomena of heat exchanges in producing a composite confection having a normally liquid core and a surrounding casing frozen to a substantially solid state. With this arrangement, the original confection carton serves as a mould for the casing and also as a medium for handling during the transportation and ultimate consumption thereof. Confections of this character may, therefore, be produced at a central plant and distributed throughout the locality thereof for sale over the counter without an accompanying dish, spoon or other eating implement. Fresh fruits or other edibles may be intermixed with the syrup in the originally frozen core 22, and these will remain in their original condition throughout the processing in accordance with the teachings of the instant invention. Obviously, the successive steps may be effected by the hand of the operator or by resort to production equipment depending upon the dictates of commercial practice. For that matter, the frozen core 22 need not be entirely submerged, since the extremity thereof may protrude to the surface of the plastic mass 24' and the composite confection maintained at a sufficiently low temperature to render both the casing 21 and the core 22 in a constantly solid state up to the moment of consumption. While this is not a preferred embodiment, yet such is possible in order to meet varying conditions and situations.

When processed in the manner described supra, the confection 20 is rendered accessible by displacing the liner 15 from the carton 10 for a sufficient distance to enable the peel-back or reverse folding of the liner walls 16, 17, 18 and 19 for hand consumption thereof in a manner similar to eating a banana. The ice cream or other normally liquid casing 21 is frozen hard and the core 22 is flowable so as to be consumed in part with each mouthful of ice cream, thereby imparting the taste characteristics of an ordinary sundae dessert which must be consumed with a spoon, dish and other utensils.

Various changes may be made in the embodiment of the invention herein specifically described without departing from or sacrificing any of the advantages of the invention as defined in the appended claims.

I claim:

1. A method of producing normally unstable confections which consists in sealing a frozen core of normally liquid material in a casing of another normally liquid material frozen to a substantially plastic state, and then freezing the resulting composite product to harden the casing with consequent liquefaction of said core effected in part by the heat exchange between said core and casing.

2. A method of producing normally unstable confections which consists in confining a flowable ice cream freeze in a pre-formed container, inserting an edible temporarily pre-formed core in said freeze, then subjecting the container with said contents to refrigeration for rendering the resulting edible sustaining and form retaining, and re-liquefying said core for confinement in said freeze by the influence of an exchange of heat therewith.

3. A method of preparing normally unstable confections which consists in converting a normally liquid material into a substantially flowable plastic substance, confining the plastic substance in a form defining container, inserting a normally liquid core frozen to a substantially solid state into said plastic substance serving as a casing therefor, and then subjecting the resulting product to further refrigeration for hardening said plastic casing to assume a form retaining shape with consequent liquefaction of said solid core to assume its normally liquid state.

4. A method of preparing normally unstable confections which consists in converting a normally liquid material into a substantially flowable plastic substance, confining the plastic substance in a form defining container, inserting a normally liquid core having a syrup content frozen to a substantially solid state into said plastic substance serving as a casing therefor, and then subjecting the resulting product to further refrigeration for hardening said plastic casing to assume a form retaining shape with consequent liquefaction of said solid core to assume its normally liquid state.

5. A method of preparing normally unstable confections which consists in freezing a normally liquid substance into a substantially plastic state, and totally confining another normally liquid edible substance frozen to a substantially solid state in said plastic substance to form a self-retaining casing, and then hardening said plastic substance by refrigeration with consequent liquefaction of said last named normally liquid substance for total confinement in said first named substance.

6. A method of producing confections which consists in partially filling cartons with a flowable edible freeze, inserting a hard frozen core possessed of a normally liquid content to displace the freeze for sealing thereof, and then hardening the freeze by subjection of said carton and content to reduced temperatures with consequent core liquefaction under the influence of heat exchange with said freeze.

7. A method of producing confections which consists in partially filling cartons with a flowable edible freeze, inserting a hard frozen core possessed of a normally liquid content to displace the freeze for complete sealing thereof, and then hardening the freeze by subjection of said carton and content to reduced temperatures with consequent core liquefaction under the influence of heat exchange with said freeze.

8. A method of producing confections which consists in partially filling cartons with a flowable ice cream freeze, inserting a hard frozen core possessed of a normally liquid content to displace the freeze for complete sealing thereof, and then hardening the freeze by subjection of said carton and content to reduced temperatures with consequent core liquefaction under the influence of heat exchange with said freeze.

9. A method of producing confections which consists in partially filling cartons with a flowable ice cream freeze, inserting a hard frozen core possessed of a syrup content to displace the freeze for complete sealing thereof, and then hardening the freeze by subjection of said carton and content to reduced temperatures with consequent core liquefaction under the influence of heat exchange with said freeze.

EDWARD NORMAN SNODGRASS.